United States Patent
Joensuu et al.

(10) Patent No.: US 8,971,336 B2
(45) Date of Patent: Mar. 3, 2015

(54) CIRCUIT ALLOCATION WITHIN A COMMUNICATION CORE NETWORK

(75) Inventors: Erkki Joensuu, Siuntio (FI); Keijo Tapio Laiho, Masala (FI)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1110 days.

(21) Appl. No.: 12/990,265

(22) PCT Filed: Apr. 30, 2008

(86) PCT No.: PCT/EP2008/055382
§ 371 (c)(1),
(2), (4) Date: Mar. 14, 2011

(87) PCT Pub. No.: WO2009/132708
PCT Pub. Date: Nov. 5, 2009

(65) Prior Publication Data
US 2011/0149742 A1    Jun. 23, 2011

(51) Int. Cl.
*G08C 15/00* (2006.01)
*H04Q 3/00* (2006.01)
*H04M 7/12* (2006.01)
*H04W 92/14* (2009.01)
*H04W 88/16* (2009.01)
*H04L 29/06* (2006.01)

(52) U.S. Cl.
CPC ........... *H04Q 3/0025* (2013.01); *H04M 7/1255* (2013.01); *H04W 92/14* (2013.01); *H04W 88/16* (2013.01); *H04L 65/1043* (2013.01)
USPC .......................................... 370/401; 370/220

(58) Field of Classification Search
USPC .................. 370/220, 351, 352, 392, 401, 465
See application file for complete search history.

(56) References Cited

U.S. PATENT DOCUMENTS

| | | | |
|---|---|---|---|
| 2002/0187790 A1* | 12/2002 | Papadimitriou et al. | ....... 455/452 |
| 2003/0002482 A1* | 1/2003 | Kubler et al. | ................. 370/352 |
| 2003/0007496 A1* | 1/2003 | Brown et al. | ................. 370/401 |
| 2003/0193957 A1* | 10/2003 | Cable et al. | .............. 370/395.51 |

(Continued)

FOREIGN PATENT DOCUMENTS

| | | |
|---|---|---|
| WO | 02/102100 A1 | 12/2002 |
| WO | 2008/011773 A1 | 1/2008 |

OTHER PUBLICATIONS

Cuervo, F. et al. "Megaco Protocol Version 1.0." IEFT Network Working Group, Request for Comments: 3015, Obsoletes: 2885, 2886, Category: Standards Track, Nov. 2000.

(Continued)

*Primary Examiner* — Habte Mered
*Assistant Examiner* — Prince A Mensah
(74) *Attorney, Agent, or Firm* — Coats & Bennett, PLLC

(57) ABSTRACT

A method of seizing Time Division Multiplex terminations at a media gateway controlled by a plurality of media gateway controllers. The method comprises receiving at the media gateway from one of said media gateway controllers, a gateway control protocol request to seize a TDM termination, the request specifying a route but not a specific Time Division Multiplex termination (103). The specified route is mapped to a set of Time Division Multiplex terminations, and one termination from the set seized on behalf of the requesting media gateway controller (104). A gateway control protocol response is then sent from said media gateway to the requesting mobile switching center, the response identifying the seized termination (105).

15 Claims, 9 Drawing Sheets

(56) References Cited

U.S. PATENT DOCUMENTS

| | | | |
|---|---|---|---|
| 2003/0231639 A1* | 12/2003 | Mikkola | 370/401 |
| 2004/0116120 A1* | 6/2004 | Gallagher et al. | 455/436 |
| 2005/0135340 A1 | 6/2005 | Lee et al. | |
| 2005/0207435 A1* | 9/2005 | Christie et al. | 370/410 |
| 2008/0125135 A1* | 5/2008 | Uchida et al. | 455/452.1 |
| 2009/0028136 A1* | 1/2009 | Lin | 370/352 |
| 2011/0122865 A1* | 5/2011 | Androski et al. | 370/352 |

OTHER PUBLICATIONS

Author Unknown. "Softswitch in Mobile Networks." Ericsson AB White Paper, Apr. 2005.

Author Unknown. "The Role of Megaco/H.248 in Media Gateway Control: A Protocol Standards Overview." Nortel Networks White Paper, retrieved on Jan. 16, 2003.

\* cited by examiner

CIRCUIT ALLOCATION WITHIN A COMMUNICATION CORE NETWORK

TECHNICAL FIELD

The present invention relates to the allocation of circuits within a communication core network. More particularly, the invention relates to a mechanism for the flexible allocation of circuits, in particular TDM time slots, amongst a pool of Media Gateway Controller servers.

BACKGROUND

In a conventional second generation mobile communication network, each geographical cell of the network is served by a Base Transceiver Station (BTS) which provides the network side of the air interface. A set of BTSs are physically connected to a Base Station Controller (BSC) which is in charge of the allocation of radio resources to subscribers. Each BSC is in turn physically connected to a Mobile Switching Center which is responsible for the routing of incoming and outgoing calls to the mobile network and is responsible, in particular, for handling the mobility of subscriber devices. The interface between the BSC and the MSC is termed the "A-interface".

Traditionally, vertically integrated networks have been built to deliver single services such as telephony or data access. FIG. 1 illustrates this vertically integrated architecture in the case of a 2G network. However, in order to increase the "modularity" of network components and therefore reduce network construction and operating costs, a solution sometimes known as the Mobile Softswitch Solution (MSS) architecture has been introduced. This architecture is described in an Internet published whitepaper titled "Efficient Softswitching", Ericsson A B, August 2006, which can be found at: http://www.ericsson.com/technology/whitepapers/8107_efficient_softswitching_a.pdf. Softswitching in combination with IP or ATM technology allows for a layered network architecture approach according to which service execution, control and connectivity can be horizontally integrated across multiple access networks. Softswitches separate the call control and switching functions into different nodes, consequently separating control and connectivity layers.

As a particular example, the conventional Mobile Switching Centre (MSC) is split in the layered softswitch architecture into an MSC Server (MSC-S) which handles the control plane signalling (acting as Media Gateway Controller (MGC)), and a Media Gateway (MGW) which handles user plane traffic. A Gateway Control Protocol (GCP), namely H.248, is used between the MSC-S and the MGW in order to allow the MSC to control user plane bearers.

In today's advanced MSS networks, server pooling is the standardised concept to achieve geographical redundancy in the networks. This avoids inter alia the failure of a single server from resulting in a failure of the network to provide services to subscribers. A generalised MSS server pooling architecture is illustrated in FIG. 2. In the case of an MSC-S pool, it will be appreciated that if one MSC-S fails, BSCs currently allocated to that MSC-S can be reallocated. In a pooled architecture, an MSC Pool Proxy can be introduced between the BSC and a pool of MSC-S in order to support BSCs that do not themselves support MSC-S pooling. This Pool Proxy acts as a single point of contact for BSCs to the MSC-S pool. In more general terms a pool proxy is used to connect network nodes to pool nodes, performing SS7 point code mapping on the A-interface. Such pool nodes can be pool servers. Whilst the MSC Pool Proxy can be a standalone node, it is preferable to integrate this functionality into the MGW in order to save on operating costs.

In the conventional 2G core network architecture, an MSC is physically connected to a BSC via a trunk cable. A Time Division Multiplex (TDM) protocol is used to multiplex user traffic onto the trunk. Each TDM time slot is identified by a Circuit Identification Code (CIC). The CIC is an identity employed at the call control level by the MSC. When TDM trunk handling in introduced into the layered network architecture, the trunk cables are connected to MGW, but the CICs are controlled in MSC-S. This is transported over the GCP interface by a termination identity, with the MSC-S performing a mapping between the CIC and the termination identity. The MGW in turn performs a mapping between termination identity and actual TDM time slots. When the MSS server pooling architecture is introduced into the 2G architecture, resulting in a given MGW being controlled by two or more MSC-Ss), the CICs associated with each trunk (connecting the MGW to a given BSC) are allocated amongst the MSC-Ss such that each MSC-S is statically allocated a sub-set of the CICs. An MSC-S uses the GCP ADD command to "seize" a particular CIC (TDM time slot).

Similarly, looking from the MGW towards a Public Switched Telephone Network (PSTN) exchange (termed a Point Of Interconnect or POI), the CICs representing TDM time slots on the trunk connecting the MGW to the PSTN exchange are statically allocated to the MSC-Ss. Of course, in any real implementation, the 2G core network will have multiple POIs including those to other Public Land Mobile Networks (PLMNs) and to emergency service centres. In order to reduce the number of MSC-Ss that are visible to the POIs, typically only two MSC-Ss are coupled to each POI via respective trunks. These MSC-Ss act as transit servers forwarding traffic to and from a chosen "operating" MSC-S. Thus, in the case of the interface towards a POI, there are always two MSC-Ss in the path.

Configuring the static allocation of CICs to MSC-Ss within a server pool is a challenging exercise. The addition of a new MSC-S within the pool will typically require reconfiguration of all other servers within the pool, and of the BSCs connected to the MSC-Ss. On the POI side, reconfiguration of transit MSC-Ss will be required (or in the absence of transit MSCs, the PSTN or other networks will require reconfiguration). Furthermore, in the event that a server within the server pool fails, the CICs allocated to that server become unavailable pending any reconfiguration. That is to say that the corresponding TDM time slots towards the BSCs or the POIs are unavailable, despite the fact that the remaining servers within the pool may have capacity to handle those slots, possibly leading to congestion on the trunks. This is particularly serious in the case of the POI interface, where the loss of a transit MSC-S will cause a dramatic reduction in capacity. A solution of course is to over-dimension the trunks, providing sufficient capacity in the event of the failure of an MSC-S. This is an expensive option.

Similar issues may arise in the case of 3G networks where TDM links will continue to be used between the MGW and the POI side (e.g. PSTN) despite the TDM links with the Radio Access Network being replaced with, for example, IP or ATM links.

SUMMARY

A mechanism is proposed which effectively delegates the selection of a TDM termination from the media gateway controller to the media gateway.

According to a first aspect of the present invention there is provided a media gateway comprising a Time Division Multiplex controller configured to control a set of Time Division Multiplex trunks towards one or more peer nodes, wherein time slots available on the trunks are identified by respective termination identities. The gateway further comprises a gateway control protocol controller for controlling an interface towards a plurality of mobile gateway controllers and in turn for controlling said Time Division Multiplex controller. The media gateway is provided with a database for maintaining mappings between routes provided over said set of Time Division Multiplex trunks and respective sets of termination identities. The gateway control protocol controller is configured to receive from a media gateway controller a gateway control protocol message requesting seizure of an unspecified termination belonging to a specified route, to inspect said database to identify a termination belonging to the specified route, to seize the identified termination, and to reply to the media gateway controller with a gateway control protocol response identifying the seized termination.

The approach described here is applicable to the Softswitch architecture described above according to which the gateway control protocol controller is configured to control an interface towards a plurality of media gateway controllers implemented within respective mobile switching centre servers.

An embodiment of the present invention can be used to control a set of Time Division Multiplex trunks towards a plurality of base station controllers within a radio access network and or towards a set of Time Division Multiplex trunks towards one or more points of interconnect.

The route may be identified to the media gateway by one of a number of alternative means. For example, the gateway control protocol controller may be configured to examine a package contained within said gateway control protocol message in order to determine said route.

A media gateway according to claim 5, said gateway control protocol controller being configured to examine said package to identify a text string contained therein, the text string defining said route. Alternatively, the gateway control protocol controller may be configured to examine a termination identity structure contained within said gateway control protocol message in order to determine said route.

In order to increase the flexibility with which seizure requests are handled at the media gateway, said gateway control protocol message may include a queuing time and/or a route blocking time, the gateway being configured to queue the termination seizure request for the specified time and/or block the requested route from non-priority termination seizure requests for the specified time.

According to a second aspect of the present invention there is provided a media gateway controller comprising a gateway control protocol controller. In use media gateway controller is configured to receive a request to seize a time division multiplex termination within a media gateway, and said gateway control protocol interface controller is configured to send to the media gateway a request to seize an unspecified termination on a specified route provided by a Time Division Multiplex trunk or trunks extending from said media gateway towards a peer network, and to receive from the media gateway a response identifying a seized termination.

One embodiment of this aspect of the invention a radio access network interface controller and a point of interconnect interface controller. In this case, said peer network is one of a radio access network and a point of interconnect. More specifically, said radio access network interface controller may be a BSSAP interface controller and said point of interconnect interface controller may be an ISUP or TUP interface controller.

A further aspect of the present invention provides for a mobile switching centre comprising a media gateway controller according to the above second aspect.

Yet another aspect of the present invention provides for a method of seizing Time Division Multiplex terminations at a media gateway controlled by a plurality of media gateway controllers. The method comprises receiving at the media gateway from one of said media gateway controllers, a gateway control protocol request to seize a TDM termination, the request specifying a route but not a specific Time Division Multiplex termination. The specified route is mapped to a set of Time Division Multiplex terminations, and one termination from the set seized on behalf of the requesting media gateway controller. A gateway control protocol response is then sent from said media gateway to the requesting mobile switching centre, the response identifying the seized termination.

A still further aspect of the present invention provides for a method of configuring a communications network comprising a plurality of media gateways controlled by a plurality of media gateway controllers, and one or more user part proxies arranged to proxy user part messages between the media gateway controllers and one or more points of interconnect, wherein each said media gateway is connected to a point of interconnect via one or more TDM links. The method comprises allocating signalling point codes to the media gateway controllers and to the or each user part proxy in order to place a user part proxy in a controlling or non-controlling state with respect to a media gateway controller corresponding to the state of the point of interconnect with respect to the user part proxy.

A still further aspect of the present invention provides for a method of operating a communications network comprising a plurality of media gateways controlled by a plurality of media gateway controllers, and one or more user part proxies arranged to proxy user part messages between the media gateway controllers and one or more points of interconnect, wherein each said media gateway is connected to a point of interconnect via one or more TDM links. The method comprises including within an Initial Address Message sent from a user part proxy to a media gateway controller an indication that the user part proxy is either the controlling or the non-controlling exchange with respect to a point of interconnect.

The user part proxy considered above is typically, though not necessarily, an ISUP proxy.

In order to delegate further responsibility to the media gateway, the media gateway controller may signal to the media gateway an indication as to whether the media gateway controller is the controlling or non-controlling exchange, i.e. using the GCP.

A still further aspect of the present invention provides for a method of operating a communications network comprising a plurality of media gateways controlled by a plurality of media gateway controllers, and one or more user part proxies arranged to proxy user part messages between the media gateway controllers and one or more points of interconnect, wherein each said media gateway is connected to a point of interconnect via one or more TDM links. The method comprises detecting a dual TDM termination seizure attempt at a user part proxy and determining at the user part proxy which attempt is to succeed and which is to fail. A TDM termination release request is then sent from the user part proxy to the media gateway controller responsible for the failing attempt.

If the media gateway controller handling the succeeding attempt and the failing attempt is the same, the user part proxy may not send the release request as the media gateway controller will itself be aware of the dual seizure attempt.

It will be appreciated that the various aspects defined above may be combined as appropriate, e.g. in order to allow the media gateway to choose the TDM termination for a particular call, and to resolve dual seizure attempts when the ISUP proxy is present.

DETAILED DESCRIPTION

Figure 1:
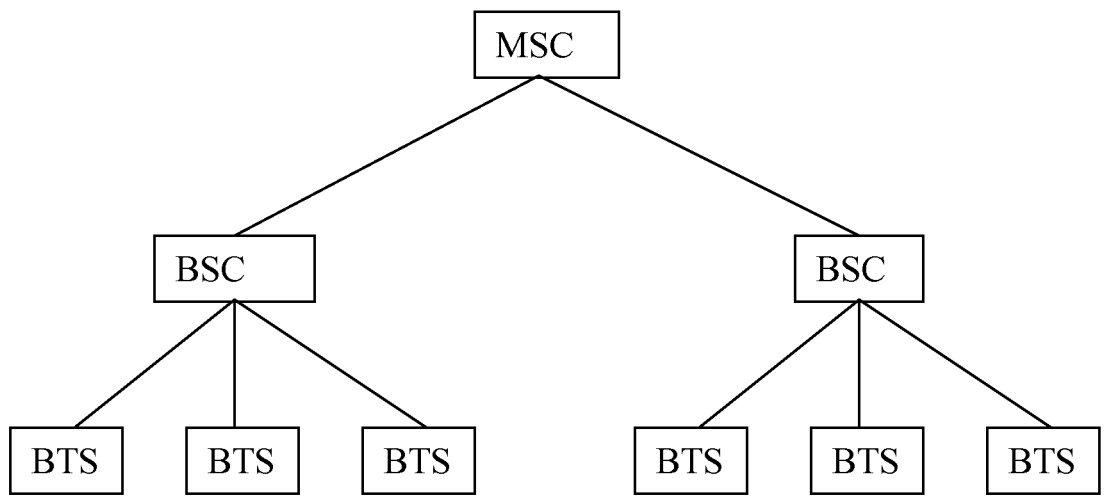
FIG. 1 illustrates schematically a vertically integrated architecture within a 2G network.
Figure 2:
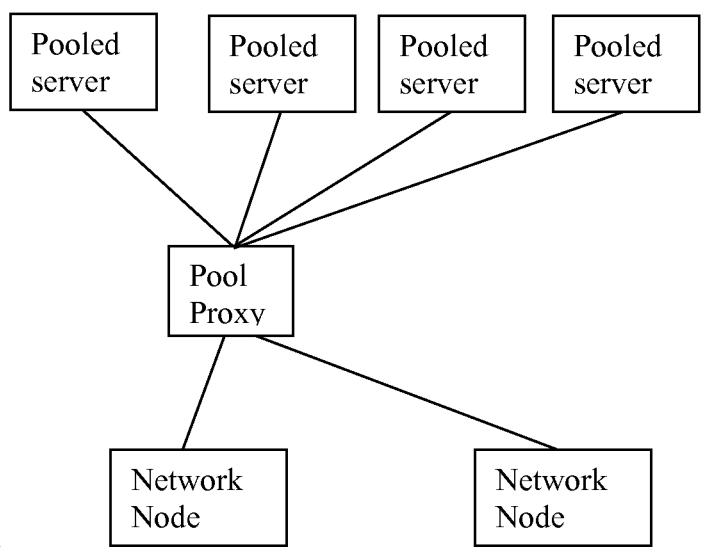
FIG. 2 illustrates schematically a generalised MSS server pooling architecture.

In the case of TDM links controlled by a Media Gateway (MGW), whether in the context of a 2G or 3G network, it is desirable to delegate, at least to some extent, Circuit Identification Codes (CIC) selection from the Media Gateway Controller (MGC) to the Media Gateway (MGW) in order to avoid CICs being bound to particular MGCs within a server pool. Upon selection of a CIC by the MGW, this is identified by the MGW to the MGC which can then signal the selected CIC to a peer signalling node, e.g. a BSC or PSTN exchange in order to set up a call leg.

Whilst this approach is applicable to a number of architectures, by way of example a 2G architecture will now be considered in which the approach is applied on both the BSC side (A-interface) and the Point of Interconnect (POI) side. In this example, a MGC is implemented within each MSC-S of a server pool. Rather than requiring that the MSC-S seize a specific TDM termination using a GCP ADD command sent to the MGW, it is proposed here that the MSC-S requests (using the GCP ADD command) the MGW to choose a TDM termination from a wildcarded range of TDM time slots towards a specific destination (e.g. towards another exchange or BSC). Upon selection of a CIC by the MGW, this is identified to the MSC-S within the GCP ADD Reply. The MSC-S can then signal the selected CIC to the peer signalling node, e.g. BSC over the A-interface (via a pool proxy), PSTN exchange, etc.

The proposed solution is of course only applicable when the MSC-S has the freedom to choose a CIC. In the case of an incoming call from another exchange (i.e. from POI side), the prior art solution prevails, i.e. the TDM termination corresponding to the CIC given by the other exchange must be used. The proposed solution also does not prevent an MSC-S from requesting s specific termination should that be required, e.g. for testing purposes.

Conventionally, a TDM time slot is identified over the GCP interface by a Termination ID as specified in 3GPP TS 29.232. One mechanism for enabling the MGW to specify a wildcarded range of TDM time slots is to maintain the existing Termination ID structure and to define a new GCP "package" containing a new string parameter that identifies a "route", i.e. a TDM selection group containing TDM circuits in the same direction (next hop) and possessing similar properties and capabilities. The group may be a trunk or trunk group or a number of time slots in a trunk towards the destination of interest or even an A-interface circuit pool within a trunk. [Packages provide a means to define additional Properties, Events, Signals and Statistics that may occur on Terminations, see: (http://tools.ietf.org/html/rfc3015#page-75)]. This new string parameter (IA5 string) is referred to below as a "route". In the MGW, the relevant TDM time slots (termination identity and CIC of each time slot) are preassigned to the route. The MSC-S uses wildcarding in GCP ADD on the top level of TDM termination and includes the above mentioned new GCP package into the GCP ADD. Thus the same route naming is visible in both the MSC-S and MGW achieving a significant benefit in terms of configuration. When the MGW receives the GCP ADD with the new package, it chooses a time slot from the range of TDM terminations preconfigured into the route indicated in the new package. An advantage of this approach is that it allows automatic exchange data configuration and auditing in the MSC-S, as well as providing for special handling of emergency calls (described further below).

As an alternative to specifying a new GCP package, the TDM termination structure as specified in 3GPP TS 29.232 may be updated, e.g. by splitting an existing field. Such a new structure will make possible for the MSC-S to request a timeslot from any trunk towards the concerned destination (e.g. BSC or other exchange) if all trunks are equivalent, or from a specific trunk group towards the concerned destination (e.g. A-interface circuit pool, emergency call centre). However, the following discussion assumes adoption of the solution presented in the previous paragraph, i.e. employing the use of a new package specifying a "route".

Figure 3:
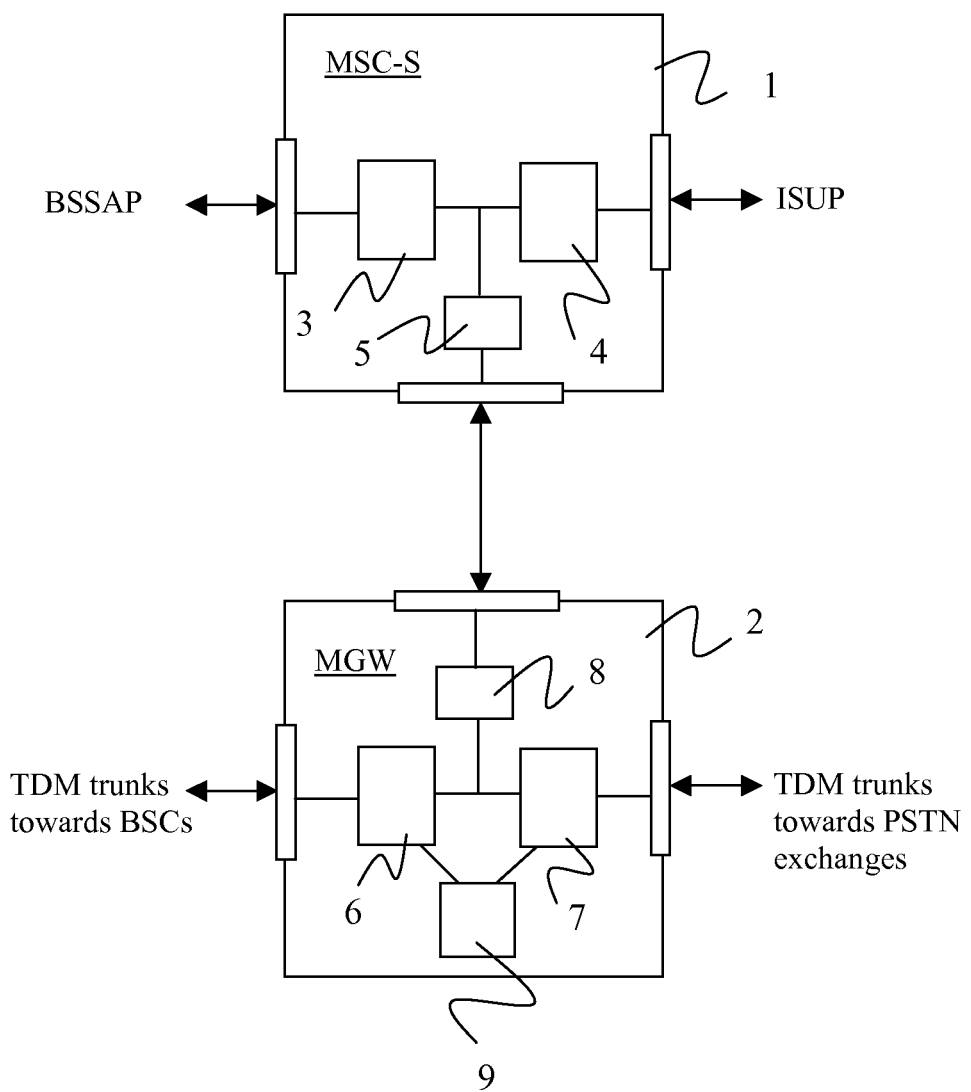
FIG. 3 illustrates in simplified schematic form the architecture of one of a pool of MSC-Ss and a MGW connected to that server.

FIG. 3 illustrates in simplified schematic form the architecture of one of a pool of MSC-Ss 1 and a MGW 2 connected to that server. The MSC-S1 has a BSSAP interface coupled to the BSCs of the radio access network. This BSSAP interface is controlled by a BSSAP interface controller 3. Similarly, an ISDN User Plane (ISUP) interface controller 4 controls the ISUP interface towards the PSTN exchanges (or towards and ISUP proxy, see below). A GCP controller 5 is responsible for controlling the GCP interface towards the MGW. The GCP controller generates and sends GCP messages and is adapted to receive and decode GCP messages, for example to send the GCP ADD messages and to receive the ADD responses. Similarly, the MGW 2 comprises a pair of TDM controllers 6,7 for controlling the TDM interfaces towards the radio access network and the PSTN. These also perform switching of the TDM links. The TDM controllers 6,7 interact with a TDM selection entity 9 to select a TDM termination appropriate for the desired route. A GCP controller 8 controls the GCP interface towards the MSC-Ss including the server 1.

Figure 4:
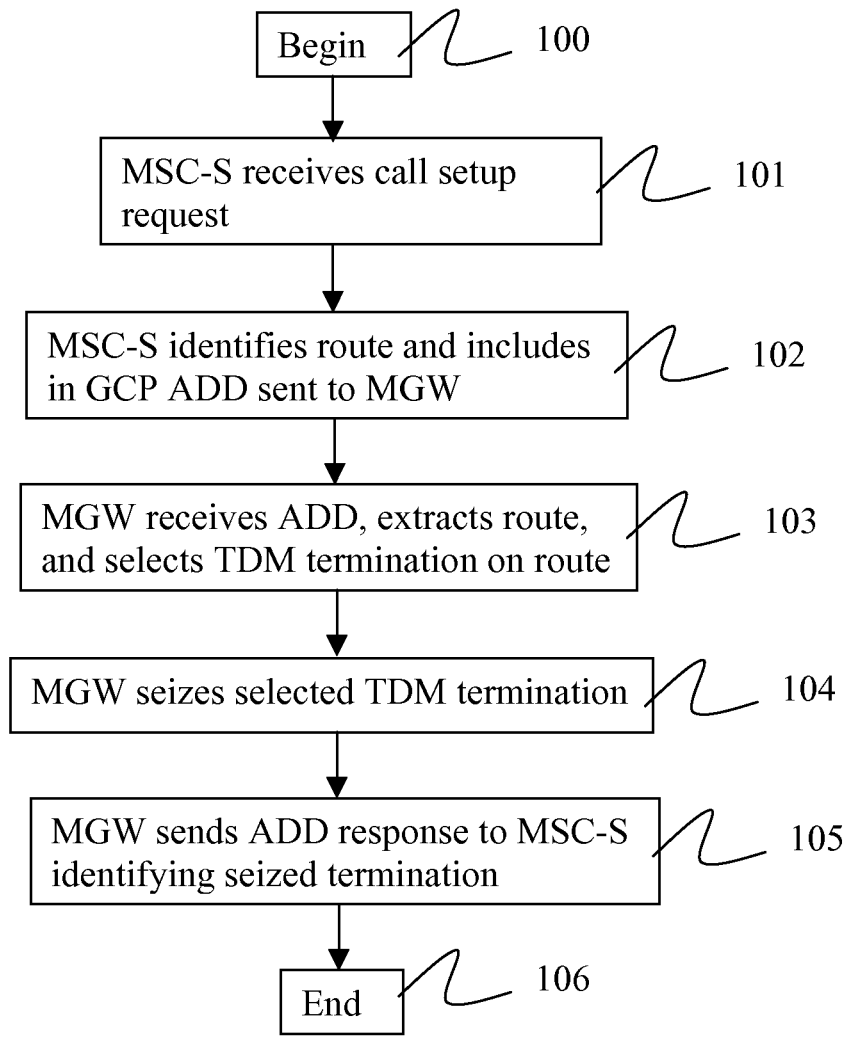
FIG. 4 is a flow diagram illustrating a TDM termination seizure process.

FIG. 4 is a flow diagram further illustrating the main steps in the TDM termination seizure process. The process begins at step 100. At step 101a MSC-S of the server pool receives a request from a BSC, over the BSSAP interface, requesting a call setup. At step 102, the MSC-S identifies a route for the call, and includes this in a GCP ADD message sent to the MGW. The MGW receives the ADD at step 103 and responds by selecting a TDM termination towards the specified route, and seizing that termination at step 104. At step 105 the MGW returns an ADD response to the MSC-S, the response including the identity of the selected termination. The process ends at step 106.

As the proposed solution transfers the CIC selection decision from the MSC-S to the MGW and it is the MSC-S that possesses knowledge of call priority/importance, the MSC-S must be prepared for congestion at the MGW. Considering for example emergency calls, Wireless Priority Calls (WPS) and enhanced Multi-Level Precedence and Pre-emption service (eMLPP), the MSC-S should inform the MGW of the priority of the call and, in case of a priority call, the GCP ADD command may contain a list of alternative routes. Thus the MGW could try to seize a free TDM time slot from the first route in the list and, in case of congestion on that route, the MGW could continue to the next route. Queuing of seizure requests at the MGW is also possible, as well as the blocking of TDM time slot seizures for non-priority calls on certain routes for a short period of time followed after timer expiry by a new seizure attempt. and new trials to seize a time slot (with or without priority blocking). The queuing time and route blocking time for non-priority calls may be included in the new GCP package, within the ADD command.

The MGW may send the status of a route with GCP ServiceChange messages to all MSC Servers. This might occur for example when all TDM terminations of a route are blocked by operation and management actions in the MGW. The GCP ServiceChange message sent from the MGW to the MSC-Ss would contain the route in the new GCP package. In addition to the route in the new package, the new package could contain an indicator instructing the receiving MSC-S to initiate appropriate blocking with the remote peer (BSC or PSTN exchange). Only one MSC-S would be instructed to send the blocking instruction to the remote peer.

In new networks and new implementations applying this solution, the configuration tasks (that is operator commands to define routes and trunks in the MSS system) could be enhanced. Since the MGW is responsible for selecting the TDM time slot, it would be beneficial to also configure the CICs in the MGW. The MGW could send the new GCP package (containing the route name and a CIC or several CICs) in the GCP ServiceChange message to all MSC-S nodes and as a result the Servers would automatically perform the TDM termination and CIC allocation to the concerned route. The ServiceChange as such could concern a single TDM termination, route or a group of TDM terminations.

Figure 5:
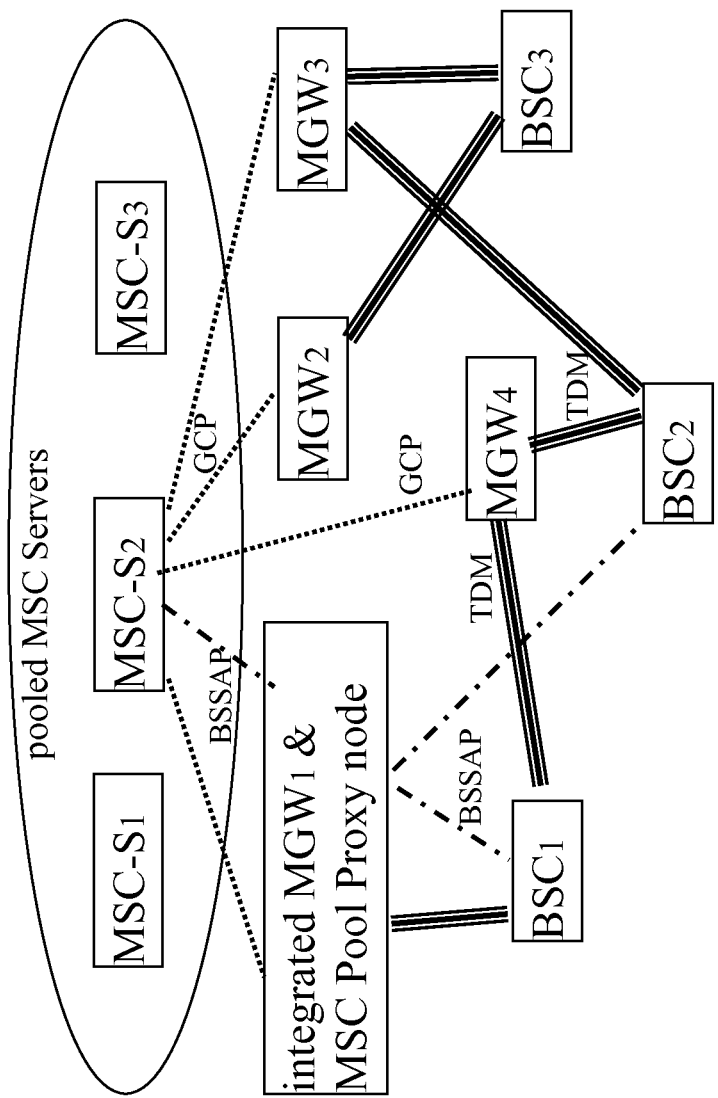
FIG. 5 illustrates a softswitch architecture showing signalling links between MSCs and MGWs.

Considering further the A-interface between the BSCs and the MSCs, it has already been explained that, in the softswitch architecture, a pool proxy will likely be present on the signalling interface (Base Station System Application Part, BSSAP) between the BSCs and the MSC-Ss. This architecture is illustrated in FIG. 5 which shows signalling links between the MSCs and the MGWs only for one MSC.

Reset and Reset Circuit messages may be sent over the A-interface in order to cause the release of all circuits on a particular link or to cause the release of only a single specified circuit. When the pool proxy receives either a Reset or Reset Circuit from a BSC, it sends the message further to all MSC Servers. As a result every MSC-S node releases the concerned calls and releases the TDM terminations in the MGW including terminations which are not engaged in any call. In order to optimise the signalling load, one or two MSC-S nodes could be defined as the "master" MSC-S nodes, and only those nodes send the GCP SUB command to MGW for terminations not engaged in any call in the MSC-S (terminations in null-context).

In order to handle a reset from an MSC-S to the MSC pool proxy, the pool proxy records which MSC-S last used a circuit. The proxy generates a Reset Circuit message for each circuit recorded for the originating MSC-S and sends this further to the concerned BSC. Thus the Reset Circuit messages are sent to all concerned BSCs.

The Proxy sends manual TDM device blocking and deblocking messages received from the BSC to the "master" MSC Server. The "master" MSC-S sends information further to the MGW in GCP ServiceChange message. The MGW sends GCP notification message to the actual MSC Server having the TDM termination in use, thus that Server is able to release the call. The "master" MSC-S may have a standby to take master MSC-S' role, if the "master" MSC-S is down. The Proxy sends the message to the "master MSC-S", if the signaling connection between the Proxy and "master MSC-S" is working. If that signaling connection is not working, the Proxy uses the standby MSC-Server for manual TDM blocking & deblocking messages.

Figure 6:
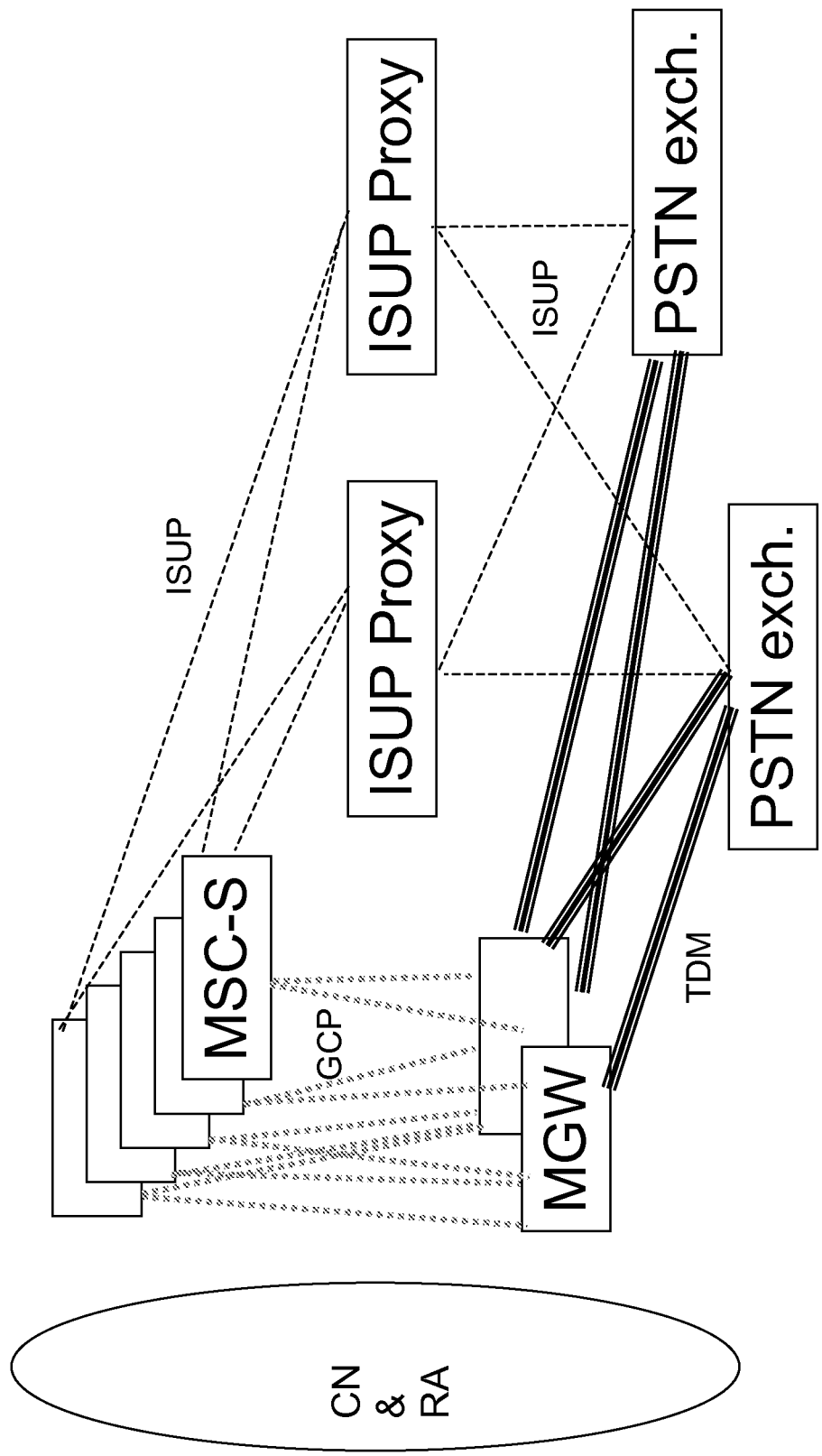
FIG. 6 illustrates a network in which ISUP proxies are introduced into the signalling path between MSC-Ss and POI exchanges.

Turning now to the POI interface, reference is made to FIG. 6. This illustrates an architecture in which a pair of ISUP proxies "hide" the MSC server pool members from the PSTN. The ISUP proxy is analogous to the MSC pool proxy of FIG. 5. The PSTN sees only the point codes of the ISUP proxies. The ISUP proxy function can be implemented in many ways, e.g. as a stand-alone node, integrated into the MGW, or integrated into the MSC-S.

An ISUP proxy distributes traffic from the PSTN to the MSC-Ss in proportion to the capacity of the MSC-Ss. All the MSC Pool members can act as gateway MSC Servers (GMSC). Traffic from the MSC pool to the PSTN goes directly from the MSC-S to the ISUP proxy and no transit exchange is needed. An ISUP proxy can handle ISUP maintenance signaling (blockings) together with MSC-S and MGW. An ISUP proxy also handles automatic congestion control (ACC), e.g. by accumulating and averaging congestion information received from the MSC-Ss and relaying the result to the PSTN exchange in one direction, and transparently copying congestion information from the PSTN to the MSC-Ss in the other direction. This requires opening of ISUP message and checking of parameters.

In the case of an incoming call from the PSTN or other external network (POI), the ISUP proxy selects an MSC-S from the server pool. The ISUP Initial Address Message (IAM) forwarded by the ISUP proxy to the selected MSC-S contains a CIC selected by the PSTN exchange. The MSC-S sends a GCP ADD to the MGW with the specific TDM termination identity (mapped to the CIC).

In the case of a mobile originating call towards the PSTN or other external network, the MSC-S (selected earlier by the MSC pool proxy) seizes a TDM termination identity from the appropriate route in the MGW using a wildcarded GCP ADD.

Again, a test call requiring a particular TDM time slot can be handled by the MSC-S requesting a specific TDM termination (not wildcarded) or any TDM termination in a test route (a special route for test calls).

Figure 7:
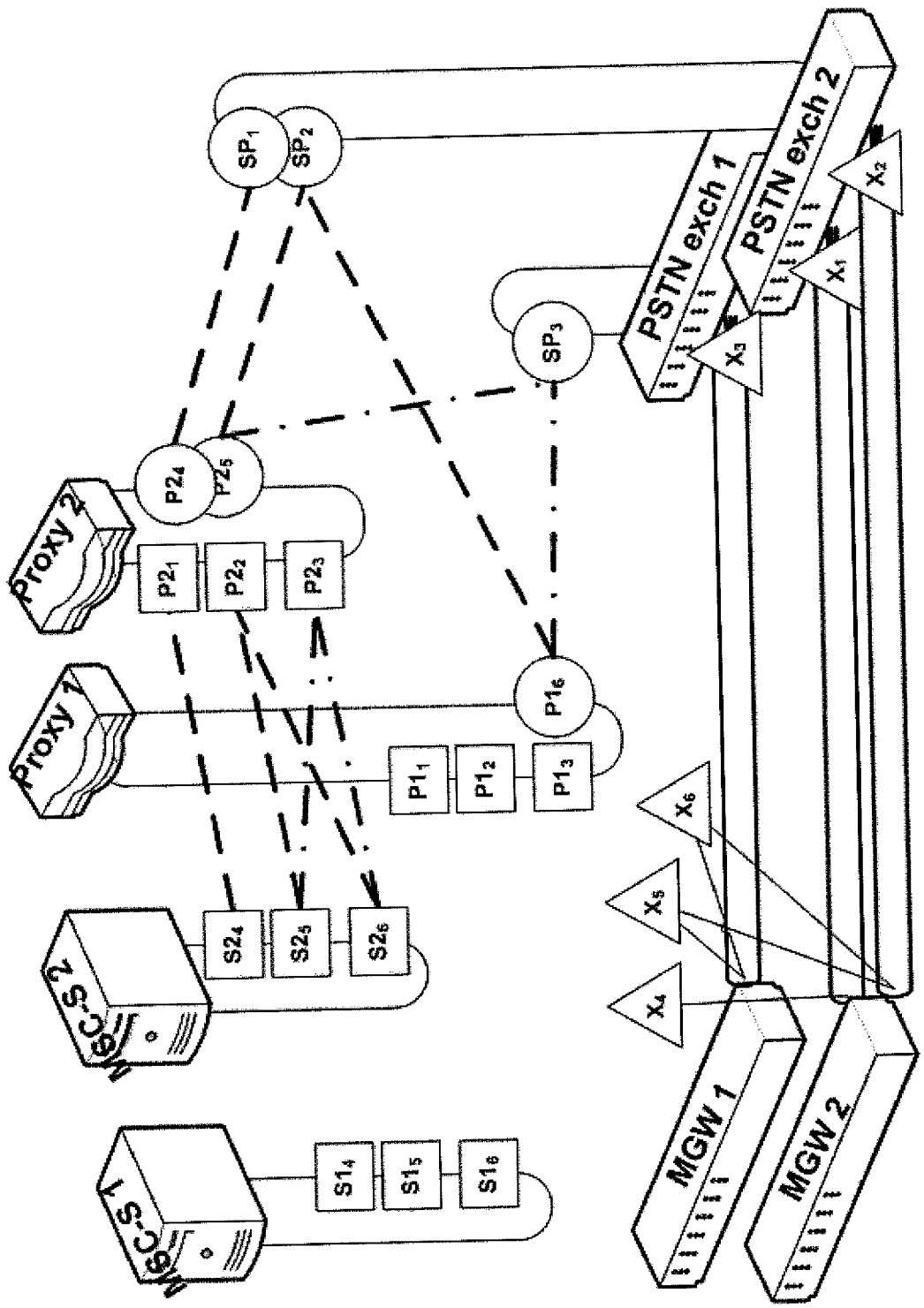
FIG. 7 illustrates a signalling point code allocation scheme for a network containing ISUP proxies.

FIG. 7 illustrates a signaling point arrangement for signaling through a POI. The Figure illustrates a first PSTN exchange having signaling points $SP_1$ and $SP_2$, and a second PSTN exchange having a signaling point $SP_3$. A first ISUP proxy is allocated signaling point $P1_6$, whilst a second ISUP proxy is allocated signaling points $P2_4$ and $P2_5$. Dashed lines between signaling points are associated with respective trunks between the MGWs and PSTN exchanges, which are identified by CICs in ISUP signaling.

The trunks between the MGWs and the PSTN exchanges are associated with different proxies, resulting in a degree of proxy redundancy. Trunks between different signaling points may use overlapping CIC values in order to be able to re-use the same CIC values for different destinations. A specific ISUP session is therefore identified by a combination of the originating and destination point codes and a CIC, i.e. OPC+DPC+CIC. In order to simplify the illustration, trunk redundancy is not shown between the PSTN exchanges and MGW nodes in FIG. 7. However, in practice, trunks extending from the PSTN exchanges 1 would go to both MGW 1 and MGW 2.

The signaling points represented by squares in FIG. 7 illustrate signaling points within the internal signaling network that are equivalent to the signaling points in the external signaling networks (represented by circles). There exist as many internal network signaling points in each proxy, three in this example, as there are destination signaling points in the external network. There are also as many internal network signaling points in each MSC server as there are local signaling points in the ISUP proxies, again three. Equivalent signaling points are denoted with the same SP-number in subscript in FIG. 7. This arrangement makes it possible to use the same CIC values in ISUP signaling in the internal signaling network as in the external signaling network, i.e. corresponding OPC+DPC+CIC triplets exist in both the internal and the external signaling networks. Thus OPC+DPC+CIC triplets in both networks can identify exactly the same E1 circuit in the POI. This identification is denoted with the squares and circles with the same number in subscript in FIG. 7. The triangles do not represent real signaling points in the network, but rather show the associated end point of a TDM-bundle.

Dual seizure attempts between an ISUP proxy and a PSTN exchange are preferably handled in accordance with the ITU-T Q.764 (ch. 2.9.1.2-2.9.1.4). Problems arise from the fact that the ISUP proxy is located between the MSC-S and the PSTN exchange and, furthermore, because the MSC-S asks for the CIC (i.e. TDM termination) from the MGW for the calls towards PSTN. In order to solve the problem in the core network, it is preferable that an MSC-S knows whether it is going to win or loose the call setup at dual seizure in order to ensure correct operation. This can be arranged by one of two mechanisms.

A first possibility is to add a new parameter into the ISUP protocol between the ISUP proxy and the MSC-S indicating whether the MSC-S is loosing or winning the call. Whilst this is technically straightforward, in practice it involves heavy implementation costs for network vendors and consequently for network operators, due to the large number of ISUP variants that are in use.

A second possibility is to configure the core network internal point codes in such a way that the control exchange and the non-control exchange relationship between the ISUP proxy and the MSC-S are the same as between the PSTN exchange and the ISUP proxy. In other words, if the PSTN exchange is the control exchange in relation to the ISUP proxy, then the ISUP proxy will be the control exchange in relation to the MSC-S. Likewise, if the ISUP proxy is the control exchange in relation to the PSTN exchange, the MSC-S will be the control exchange in relation to the ISUP proxy.

Referring again to FIG. 7, it can be seen that the point code arrangement is easily configurable and the second possibility is therefore the preferred choice. The same SP number (indicated with subscripts in FIG. 7) illustrates an equivalence between signaling points. The absolute signaling point code values must differ in each signaling network. However, it is desirable that the relationship between OPC and DPC is the same, in order to make dual seizure decisions in the same way in the MSC servers as in the ISUP proxies. For example, if the signaling points in the external signaling network have the same absolute values as denoted in FIG. 7, i.e. SPC of $SP_1$ is 1, SPC of $SP_3$ is 3 and SPC of $P2_4$ is 4, then the SPC values in the internal signaling network should be: SPC of $P2_1$ is 12, SPC of $P2_3$ is 32 and SPC of $S2_4$ is 42. This ensures that, as SPC of $P2_4$ is greater than SPC of $SP_3$ and SPC of $P2_4$ is greater than SPC of $SP_1$, the same relationships are valid for the associated signalling points in the internal network, i.e. SPC of $S2_4$ is greater than SPC of $P2_3$ and $S2_4$ is greater than SPC of $P2_1$.

It will be appreciated that certain signalling is omitted from FIG. 7. In particular the Figure shows only signaling between MSC server S2 and ISUP proxy P2. Corresponding relationships exist also between S1 and P2, S1 and P1, and S2 and P1, since each MSC server can reserve any E1 circuit in the TDM pool. In order to maintain the same relationship between SPC values between each server-proxy pair and external signaling points, corresponding SPCs are allocated for internal signaling points, i.e. SPC of $P1_1$ is 11, SPC of $P1_3$ is 31 and SPC of $S1_4$ is 41. That is to say that SPC of $S2_4$ is greater than SPC of $P1_1$, $S2_4$ is greater than SPC of $P1_3$, and SPC of $S1_4$ is greater than SPC of $P2_1$.

Figure 8:
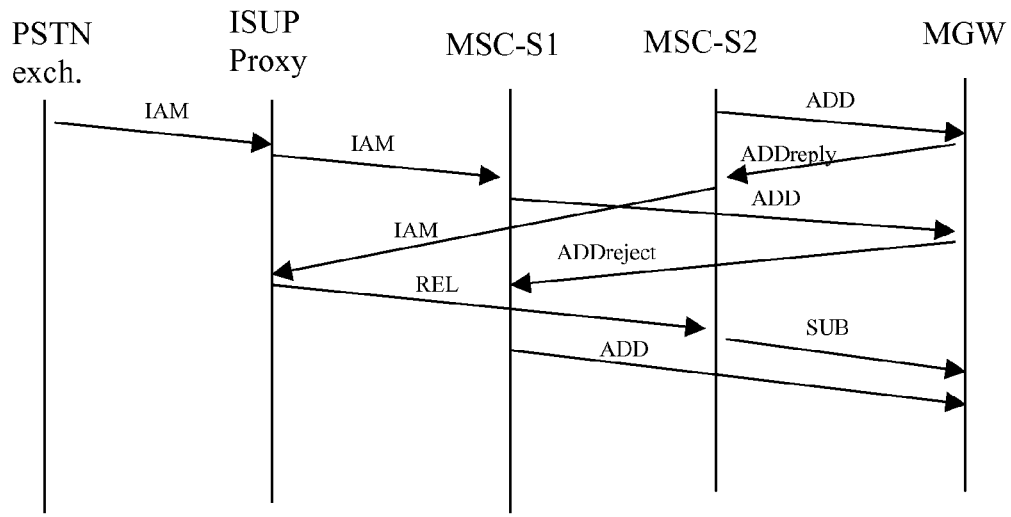
FIG. 8 illustrates a signalling flow for a scenario in which a PSTN exchange is the control exchange and an ISUP IAM comes first from the PSTN exchange to the ISUP proxy, the scenario involving two different media gateways.

FIG. 8 illustrates a signalling flow associated with a situation when the PSTN exchange is the control exchange and the ISUP IAM comes first from the PSTN exchange to the ISUP proxy. The ISUP proxy selects one of the MSC-Ss, in this case MSC-S1, and sends the IAM towards that selected server. At the same time, MSC-S2 has started an outgoing call by sending a GCP ADD to the MGW and by chance the MGW has selected the same TDM termination (CIC) as the PSTN exchange. The ISUP proxy is aware of the dual seizure situation and must release the call initiated by the MSC-S2, since the PSTN initiated call has precedence in this particular case. In the meantime, the MSC-S1 has sent a GCP ADD to the MGW, but as MSC-S2 has already seized that CIC (TDM termination), the MGW rejects MSC-S1's request (returning an indication to MSC-S1 that the termination is already in use). However, as MSC-S1 knows (a) that the ISUP proxy (in fact the PSTN exchange) is the control exchange, and (b) that there is a dual seizure situation because it has received the MGW's reject message, MSC-S1 reattempts seizure of the concerned TDM termination in MGW. The reattempt will succeed after the MSC-S2 has sent a GCP SUBTRACT to the MGW and released the concerned TDM termination. The ISUP release message sent by the ISUP proxy to the MSC-S2 could indicate the reason for the release allowing MSC-S2 to continue the setup of the outgoing call.

The GCP ADD message from MSC-S1 could contain an indication that the PSTN exchange is the control exchange for the indicated TDM termination (CIC). Thus the MGW could request release of the termination from MSC-S2. Based on the indication the MGW would also send a GCP PENDING message to MSC-S1 instead of an ADD reject. The MGW would then await the SUBTRACT message from MSC-S2 before responding with an ADD reply to MSC-S1.

Figure 9:
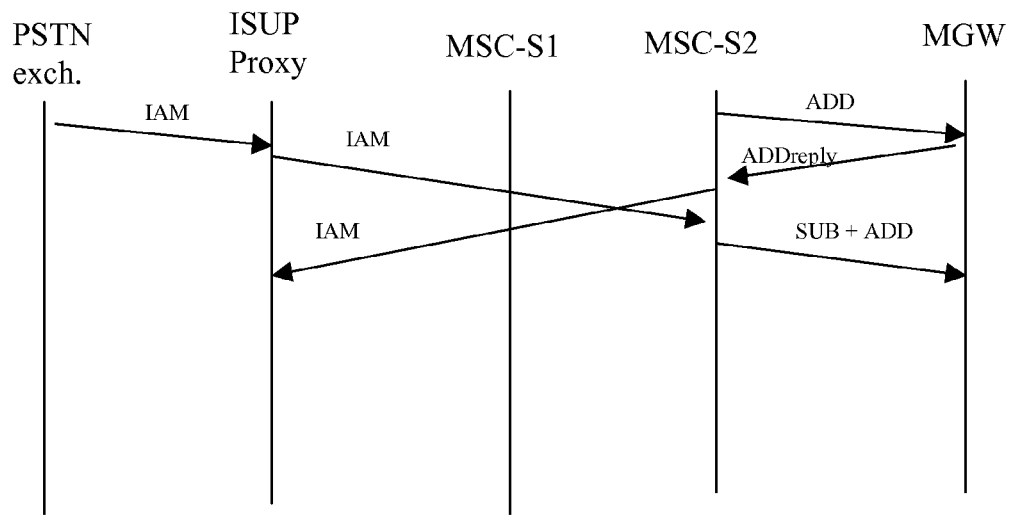
FIG. 9 illustrates a signalling flow for a scenario in which a PSTN exchange is the control exchange and an ISUP IAM comes first from the PSTN exchange to the ISUP proxy, the scenario involving a single media gateway.

FIG. 9 again illustrates a signaling flow associated with a situation when the PSTN exchange is the control exchange and the ISUP IAM comes first from the PSTN exchange to the ISUP proxy. The ISUP proxy selects one of the MSC-Ss, in this case MSC-S2, and sends the IAM to MSC-S2. At the same time as the PSTN exchange has sent the IAM, MSC-S2 has started an outgoing call by sending a GCP ADD to the MGW. By chance, the MGW has selected the same TDM termination (CIC) as the PSTN exchange. Both MSC-S2 and the ISUP proxy note the dual seizure situation. The MSC-S2 implements the normal procedure, i.e., it releases the CIC in the MGW using a GCP SUBTRACT and sends a new GCP ADD identifying the CIC after the MGW has responded to the termination release (the SUBTRACT and ADD are included within the same GCP message). At the same time the MSC-S2 will continue with the execution of the outgoing call. As the ISUP proxy notes that the dual seizure situation occurs with the same MSC-S, it does not send a REL message to MSC-S2.

Figure 10:
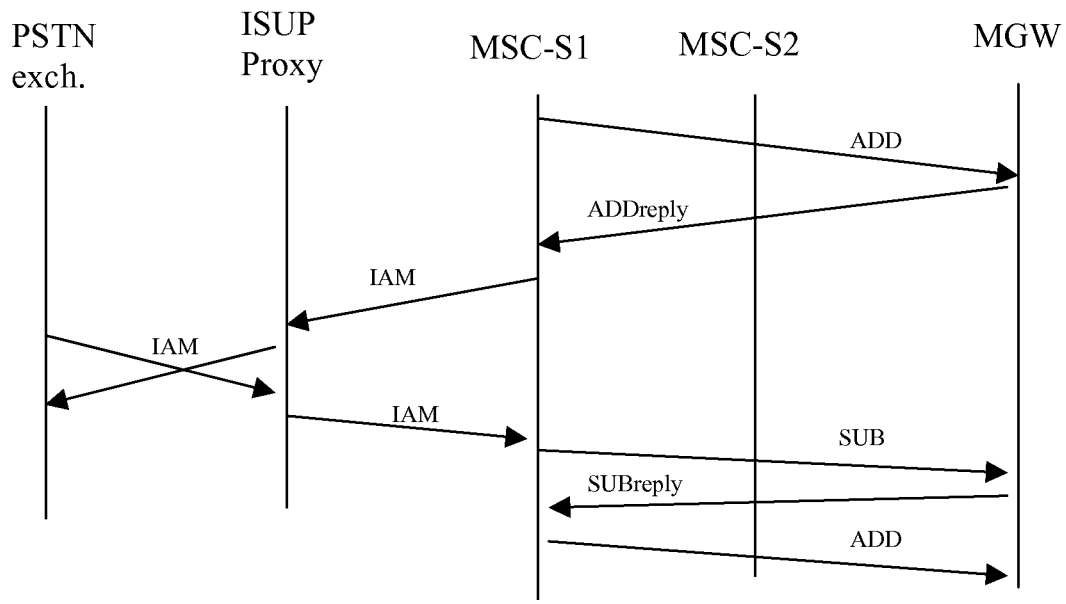
FIG. 10 illustrates a signalling flow for a scenario in which the PSTN exchange is the control exchange, and the ISUP proxy first receives an IAM from the MSC-S1, and substantially simultaneously receives an IAM from the PSTN exchange.

FIG. 10 illustrates a signaling flow associated with the situation when the PSTN exchange is the control exchange, and the ISUP proxy first receives an IAM from the MSC-S1, and substantially simultaneously receives an IAM from the PSTN exchange. Both IAMB relate to the same CIC. The ISUP proxy notes the dual seizure situation and sends the IAM received from the PSTN exchange to MSC-S1. Now the MSC-S1 notes the dual seizure situation and acts accordingly, i.e., it releases the TDM termination used for the outgoing call and seizes the same termination for the call entering from the PSTN. The MSC-S1 has at least three options to proceed with the call entering from the PSTN, i.e., 1) reusing directly the termination, 2) releasing and re-seizing the termination, or 3) reusing and modifying the termination properties. Note that the calls may use quite different properties, e.g. one may be a data call and the other may be a speech call. Regarding outgoing calls to the PSTN exchange, the MSC-S1 acts as normal for a new call.

Figure 11:
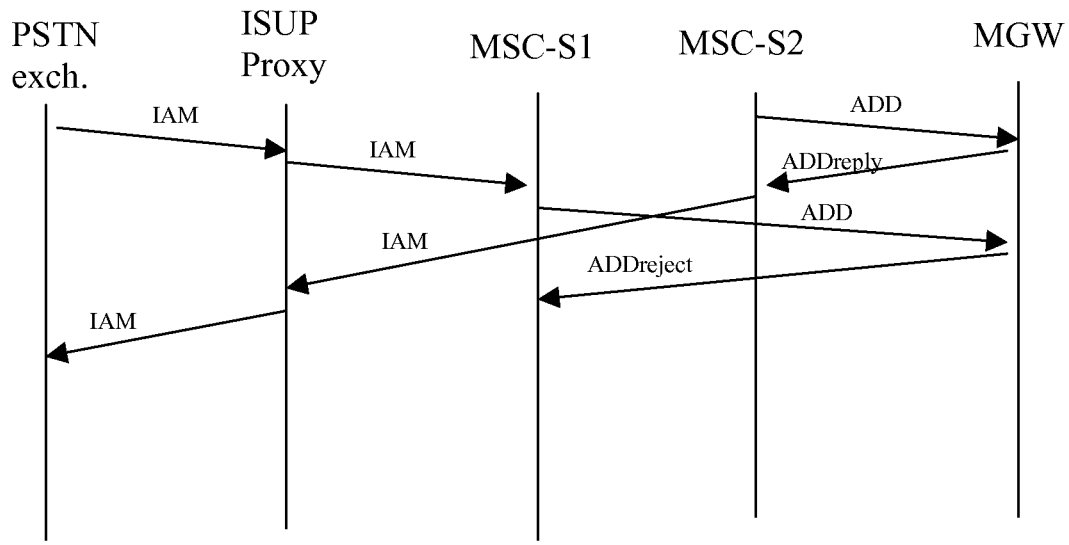
FIG. 11 illustrates a signalling flow for a scenario in which the PSTN exchange is the non-control exchange and the IAM comes first from the PSTN exchange.

FIG. 11 illustrates a signalling flow associated with a situation when the PSTN exchange is the non-control exchange. An ISUP IAM to the ISUP proxy comes first from the PSTN exchange. The proxy selects MSC-S1 and forwards the IAM to that server. When a second IAM comes to the ISUP proxy from the MSC-S2 relating to the same CIC, the ISUP proxy notes the dual seizure situation and sends the second IAM further to the PSTN exchange. The MSC-S1 receives a reject from the MGW indicating that the termination is already in use (already seized by MSC-S2). However, as the MSC-S1 knows that the PSTN exchange is the non-control exchange, it drops the call. The PSTN exchange is similarly aware of this situation.

Figure 12:
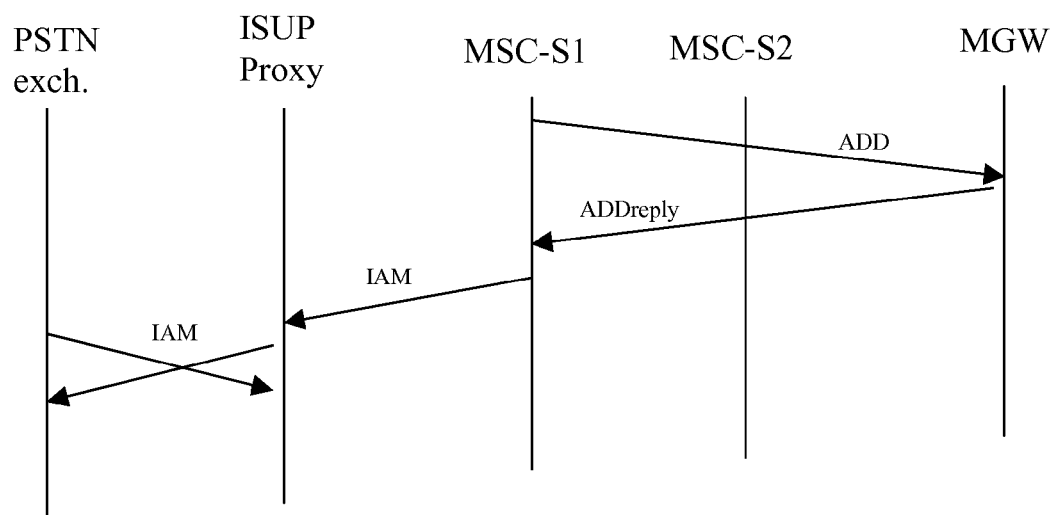
FIG. 12 illustrates a signalling flow for a scenario in which the PSTN exchange is the non-control exchange and the IAM comes first from the MSC.

FIG. 12 illustrates a signaling flow associated with a situation when the PSTN exchange is the non-control exchange. An ISUP IAM to the ISUP proxy comes first from the MSC-S1, followed by an IAM, relating to the same CIC, from the PSTN exchange. The ISUP proxy notes the dual seizure situation and discards the IAM received from the PSTN.

Returning to a general consideration of the use of an ISUP proxy, the ISUP proxy may make use of a location query (MAP operation) to the HLR using a Mobile Station ISDN (MSISDN) as the input parameter. The HLR returns to the proxy the MSC number pointing to the MSC-S where the subscriber is currently registered. Calls entering the ISUP proxy with a Mobile Station Roaming Number (MSRN) and MSISDN must be distinguished. Calls with an MSRN can be sent directly to the correct MSC-S by mapping the MSC-S point codes and the MSC-S MSRN number series in the ISUP proxy, whilst for calls containing an MSISDN the HLR lookup is required. In the absence of such an optimisation, a mobile terminating call will be directed by the ISUP proxy to a randomly selected MSC-S, and which is probably not the server with which the terminating subscriber is currently registered, resulting in the call being transited between two servers and resulting in a two context call.

As an alternative to the use of an ISUP proxy, special Transit MSC-S (TMSC-S) nodes may be introduced into the core network. The TDM terminations are configured only in TMSC-S nodes and the TMSC-S nodes choose the TDM terminations to be used for a call. The MSC-S nodes have no configured exchange data for TDM terminations. Rather, this data is maintained in the TMSC-Ss. The TMSC-S reserves the TDM termination identity and passes this in BICC signaling to the MSC-S. The MSC-S uses the given TDM termination identity in the GCP signaling for traffic handling in the same way as it does today. That is valid for both originating calls from the PLMN and terminating calls to the PLMN. For normal call cases, the TMSC-S does not create a GCP context in the MGW as normally there are no two context calls.

In the case of mobile terminating calls, the TMSC-S acts as GMSC-S and makes the HLR query (SRI). It also handles Number Portability and terminating IN-service.

From the MGW point of view, the owner of the TDM termination is the TMSC-S, thus all operation and management related ServiceChanges for TDM termination are sent to the TMSC-S. The MGW has to accept that any server controls any TDM termination at traffic handling. The TMSC-S may need to control the MGW in certain cases, for example in order to play an announcement to the calling subscriber, in the mobile terminating call case, prior to unconditional call forwarding.

Whilst the above discussion has concerned a MGC implemented at an MSC-S, the media gateway may alternatively be implemented at some other network component, for example a video gateway or PSTN gateway (open network gateway).

The invention claimed is:

1. A media gateway comprising:
   a Time Division Multiplex controller configured to control a set of Time Division Multiplex trunks towards one or more peer nodes, wherein time slots available on the trunks comprise terminations and are identified by respective termination identities;
   a database for maintaining mappings between routes provided over said set of Time Division Multiplex trunks and respective sets of termination identities;
   a gateway control protocol controller configured to control an interface towards a plurality of mobile gateway controllers, to control said Time Division Multiplex controller, and to: receive from a media gateway controller a gateway control protocol message requesting seizure of an unspecified termination belonging to a specified route;
   inspect said database to identify a termination having a termination identity that is mapped to the specified route;
   seize the identified termination;
   and reply to the media gateway controller with a gateway control protocol response identifying the seized termination;
   and wherein said gateway control protocol message includes a queuing time, a route blocking time, or both and wherein the media gateway is configured to queue the termination seizure request for the specified time, block the specified route from non-priority termination seizure requests for the specified time, or both.

2. The media gateway according to claim 1, wherein said gateway control protocol controller is configured to control an interface towards a plurality of media gateway controllers implemented within respective mobile switching centre servers.

3. The media gateway according to claim 1, wherein said Time Division Multiplex controller is configured to control a set of Time Division Multiplex trunks towards a plurality of base station controllers within a radio access network.

4. The media gateway according to claim 1, wherein said Time Division Multiplex controller is configured to control a set of Time Division Multiplex trunks towards one or more points of interconnect.

5. The media gateway according to claim 1, wherein said gateway control protocol controller is configured to examine a package contained within said gateway control protocol message in order to determine said specified route.

6. The media gateway according to claim 5, wherein said gateway control protocol controller is configured to examine said package to identify a text string contained therein, the text string defining said specified route.

7. The media gateway according to claim 1, wherein said gateway control protocol controller is configured to examine a termination identity structure contained within said gateway control protocol message in order to determine said specified route.

8. A media gateway controller comprising:
a gateway control protocol controller configured to:
receive a request to seize a Time Division Multiplex (TDM) termination within a media gateway;
send to the media gateway a request to seize an unspecified TDM termination on a specified route provided by a TDM trunk or trunks extending from said media gateway towards a peer network;
and receive from the media gateway a response identifying a seized TDM termination;
a radio access network interface controller;
a point of interconnect interface controller;
and wherein:
said peer network is one of a radio access network and a point of interconnect;
said radio access network interface controller is a Base Station System Application Part (BSSAP) interface controller;
and said point of interconnect interface controller is an ISDN User Plane (ISUP) or Telephone User Part (TUP) interface controller.

9. A mobile switching centre comprising a media gateway controller, the media gateway controller comprising:
a gateway control protocol controller configured to:
receive a request to seize a Time Division Multiplex (TDM) termination within a media gateway;
send to the media gateway a request to seize an unspecified TDM termination on a specified route provided by a TDM trunk or trunks extending from said media gateway towards a peer network;
and receive from the media gateway a response identifying a seized TDM termination;
a radio access network interface controller;
and a point of interconnect interface controller;
and wherein:
said peer network is one of a radio access network and a point of interconnect;
said radio access network interface controller is a Base Station System Application Part (BSSAP) interface controller;
and said point of interconnect interface controller is an ISDN User Plane (ISUP) or Telephone User Part (TUP) interface controller.

10. A method of seizing Time Division Multiplex (TDM) terminations at a media gateway controlled by a plurality of media gateway controllers, the method comprising:
receiving at the media gateway from one of said media gateway controllers, a gateway control protocol request to seize a TDM termination, the request specifying a route but not a specific TDM termination;
mapping said route to a set of TDM terminations;
seizing one TDM termination from the set on behalf of the requesting media gateway controller;
and sending a gateway control protocol response from said media gateway to the requesting media gateway controller that identifies the seized TDM termination and wherein said gateway control protocol request includes a queuing time, a route blocking time, or both and wherein the media gateway is configured to queue the termination seizure request for the specified time, block the specified route from non-priority termination seizure requests for the specified time, or both.

11. A method of configuring a communications network comprising a plurality of media gateways controlled by a plurality of media gateway controllers, and one or more user part proxies arranged to proxy user part messages between the media gateway controllers and one or more points of interconnect, wherein each said media gateway is connected to a point of interconnect via one or more Time Division Multiplex (TDM) links, the method comprising:
allocating signalling point codes to the media gateway controllers and to each user part proxy in order to place a user part proxy in a controlling or non-controlling state with respect to a media gateway controller that corresponds to the state of the point of interconnect with respect to the user part proxy;
and signalling from a media gateway controller to a media gateway an indication as to whether the media gateway controller is a controlling or a non-controlling exchange.

12. The method according to claim 11, wherein said user part proxy is an ISDN User Plane (ISUP) proxy.

13. A method of operating a communications network comprising a plurality of media gateways controlled by a plurality of media gateway controllers, and one or more user part proxies arranged to proxy user part messages between the media gateway controllers and one or more points of interconnect, wherein each said media gateway is connected to a point of interconnect via one or more Time Division Multiplex (TDM) links, the method comprising:
sending an Initial Address Message from a user part proxy to a media gateway controller that indicates the user part proxy is either a controlling or a non-controlling exchange with respect to a point of interconnect;
and signalling from a media gateway controller to a media gateway an indication as to whether the media gateway controller is a controlling or a non-controlling exchange.

14. The method according to claim 13, wherein said user part proxy is an ISDN User Plane (ISUP) proxy.

15. A method of operating a communications network comprising a plurality of media gateways controlled by a plurality of media gateway controllers, and one or more user part proxies arranged to proxy user part messages between the media gateway controllers and one or more points of interconnect, wherein each said media gateway is connected to a point of interconnect via one or more Time Division Multiplex (TDM) links, the method comprising:
  detecting dual TDM termination seizure attempts at a user part proxy;
  determining at the user part proxy which of the dual TDM termination seizure attempts is to succeed and which is to fail;
  and sending a TDM termination release request from the user part proxy to a media gateway controller responsible for the attempt determined to fail;
  and wherein sending the TDM termination release request comprises sending the TDM termination release request unless the media gateway controller handling the attempt determined to fail is the same as a media gateway controller handling the attempt determined to succeed.

* * * * *